United States Patent
Brown, Jr.

[11] 3,894,385
[45] July 15, 1975

[54] CUTTING HEAD FOR ROTARY LAWN MOWER

[76] Inventor: Charles K. Brown, Jr., 8000 Roberts Bruce Dr., Bon Air, Richmond, Va. 23235

[22] Filed: Jan. 15, 1974

[21] Appl. No.: 433,570

[52] U.S. Cl. ................................................ 56/295
[51] Int. Cl. ........................................... A01d 55/18
[58] Field of Search ................... 56/295, 255, 17.5

[56] References Cited
UNITED STATES PATENTS

| | | | |
|---|---|---|---|
| 660,153 | 10/1900 | Ervin | 56/295 |
| 2,167,222 | 7/1939 | Shelor | 56/17.5 |
| 2,702,977 | 3/1955 | Carter | 56/14.7 |
| 2,721,438 | 10/1955 | O'Maley | 56/295 |
| 2,740,249 | 4/1956 | Stearns | 56/295 |
| 2,924,058 | 2/1960 | Brooks | 56/295 |
| 3,140,575 | 7/1964 | Ott et al. | 56/295 |
| 3,343,350 | 9/1967 | Feedlander et al. | 56/295 |
| 3,429,112 | 2/1969 | Fegan et al. | 56/295 |
| 3,500,622 | 3/1970 | Bowen | 56/295 |
| 3,540,198 | 11/1970 | Heth et al. | 56/295 |

*Primary Examiner*—Russell R. Kinsey
*Attorney, Agent, or Firm*—Walter Z. Fuch

[57] ABSTRACT

An improved cutting head is provided to replace the conventional double edge blade for rotary lawn mowers which will make them safer, quieter and more efficient. This improved cutting head consists essentially of a disc with pivotal mounted counterbalanced blades, two or more in number, depending on the overall diameter of the cutting head. The disc construction can be varied in several ways to provide a support for the individual blades. A double disc cutting head is preferred because it provides a double support for the pivot pin that makes it act as a short simple, beam.

13 Claims, 13 Drawing Figures

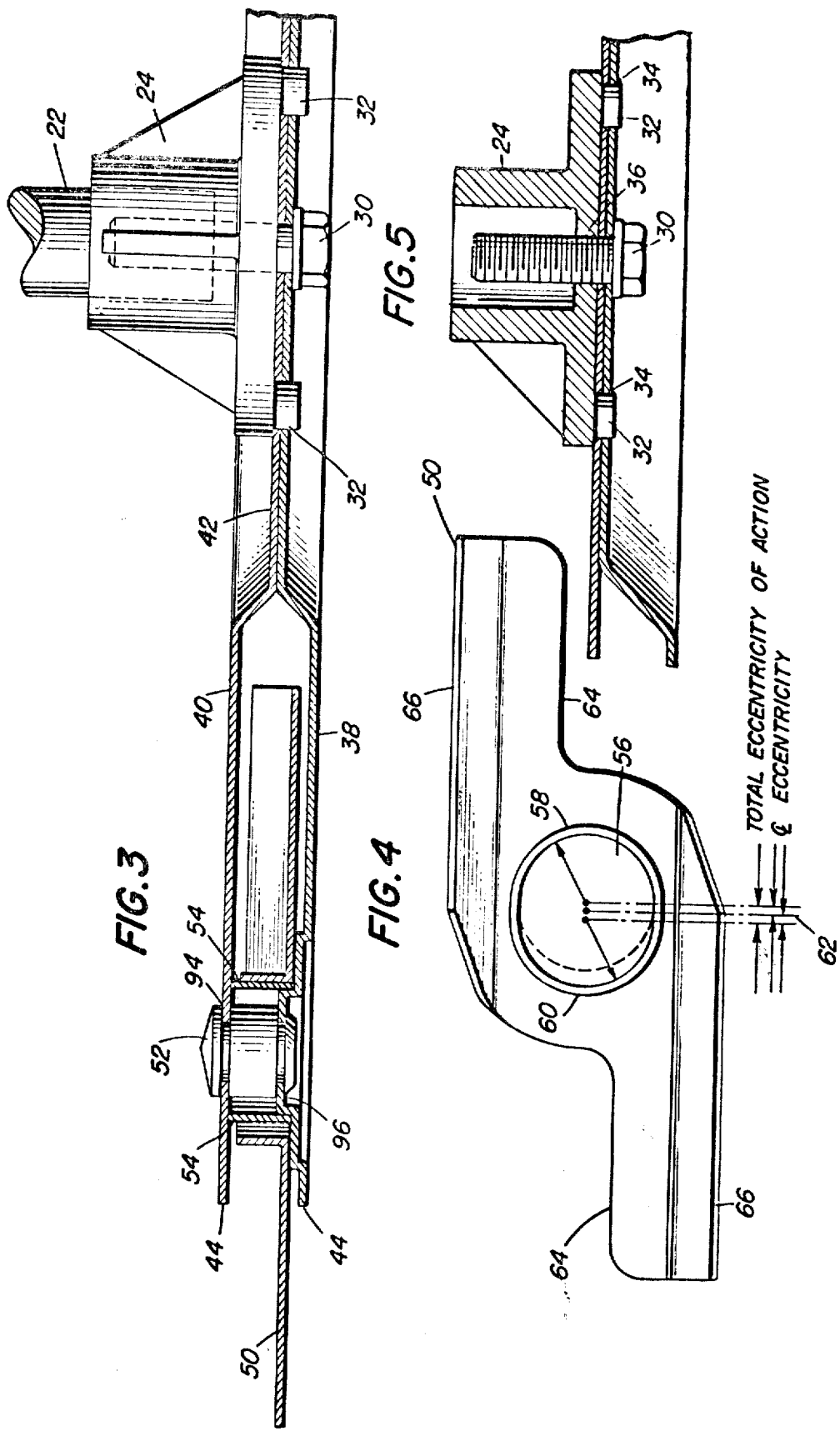

CUTTING HEAD FOR ROTARY LAWN MOWER

This invention relates generally to grass cutting apparatus, and more particularly to a novel cutting head for a conventional rotary type lawn mower.

It is an object of this invention to provide an improved cutting head for rotary type lawn mowers that will make them safer, quieter and more efficient in operational use.

Another object of this invention is to provide an improved cutting head for a rotary type lawn mower that utilizes a multiplicity of counter balanced blades, making it possible to rotate the cutting head at a slower speed compared to conventional type rotary lawn mowers using one conventional double ended blade.

Still even another object of this invention is to provide a novel cutting head for a rotary type lawn mower which reduces noise and minimizes exhaust pollution.

Also, another object of this invention is to provide a novel cutting head for a conventional rotary type lawn mower which is more economical to operate, and which is easy to assemble and maintain.

A still further object of this invention is to provide a cutting head for a rotary lawn mower which is less likely to injure the operator of the mower by throwing stones or other foreign objects, and which minimizes injurious damage to the hands or feet of the operator due to instantaneous release of the cutting pressure of the blades upon contact.

Other objects and attendant advantages of this invention will become more readily apparent and understood from the following detailed specification and accompanying drawings in which:

FIG. 3 is a cross-section taken along line 3—3 of FIG. 2;

FIG. 4 is a plan view of the preferred embodiment of a pivotally mounted, counterbalanced double ended blade;

FIG. 5 is a partial cross-section of a modification of the disc design of FIG. 3;

Referring now to FIGS. 2, 3, 4 and 5 of the drawings, there is shown a cutting head 20, incorporating features of this invention, for use as the cutting head of a conventional rotary lawn mower consisting of a vertical shaft motor mounted on a multiple wheel carriage, either hand pushed or power operated (not shown).

Figure 2:
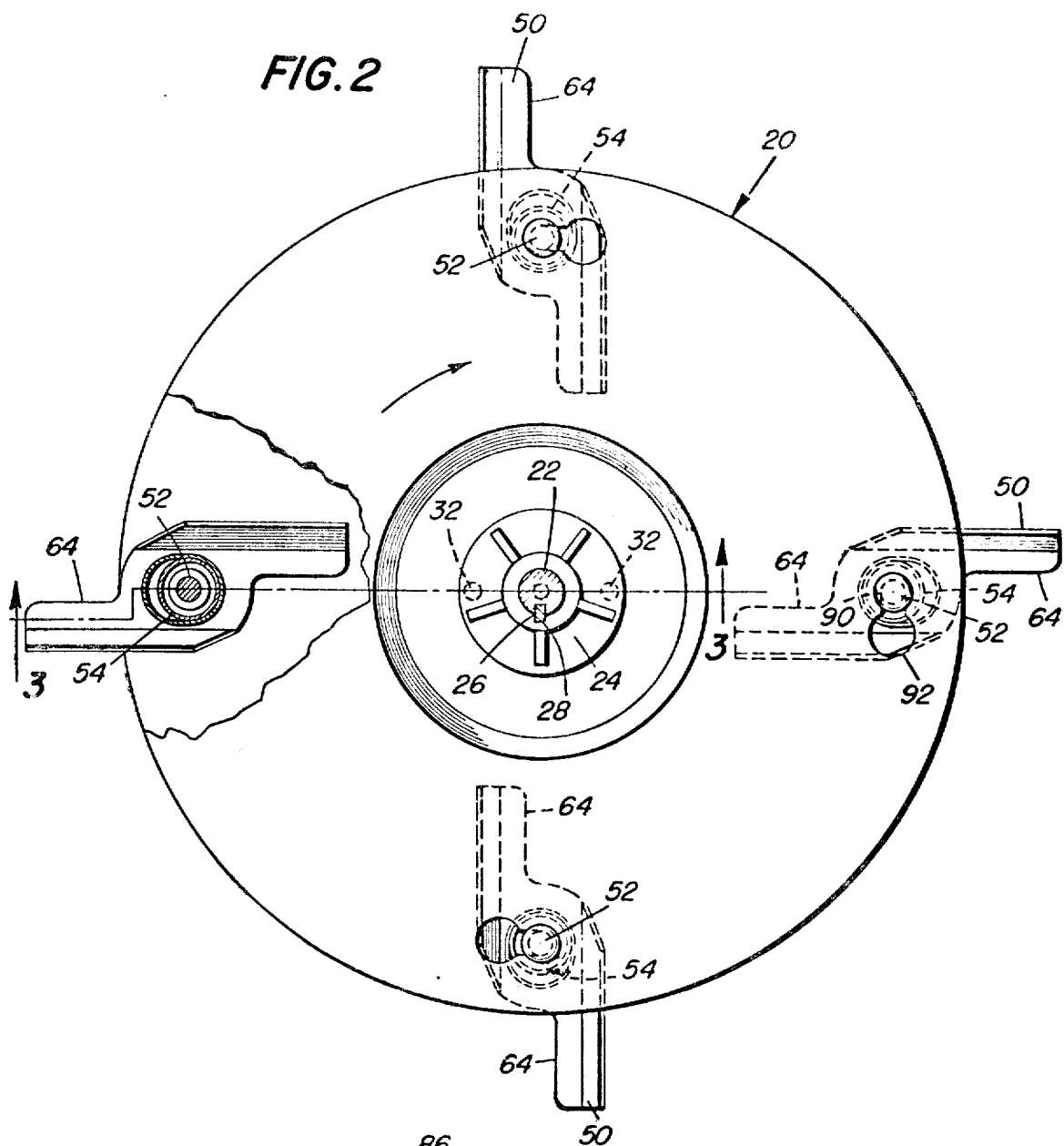
FIG. 2 is a plan view, partially cutaway, of a cutting head for a conventional rotary lawn mower incorporating features of this invention, showing a plurality of pivotally mounted, counterbalanced double ended blades.

The power from the motor (not shown) is transmitted through a vertical shaft 22 in which a hub 24 is keyed by a key 26 positioned in keyway 28, shown in FIG. 2.

The hub 24, best shown in FIG. 3, provides driving support for the novel cutting head 20 of this invention. A bolt 30 secures the cutting head 20 and the hub 24 to the vertical shaft 22. Two spaced pins 32, as shown in FIGS. 3 and 5, key the cutting head 20 to the hub 24. It is to be noted that the holes 34 for the two spaced pins 32 and the hole 36 in the hub 24 and the center of the cutting head 20 for the mounting bolt 30 are in alignment, with the holes 34 being positioned equidistant from the hole 36 in the hub 24 and cutting head 20.

The cutting head 20 consists of two formed discs 38 and 40, as shown in FIG. 3, which are juxtaposed at the center area 42 for coupling to the hub 24 as previously described and are spread apart on the peripheral edges 44 to receive therebetween a plurality of pivotally mounted cutting blades 50, as best shown in FIGS. 2, 3, and 4.

As shown in the cutting head 20 of FIG. 2, there are illustrated four spaced cutting blades 50. These cutting blades 50, in the cutting head 20, are mounted in multiples of two to maintain balance of the cutting head 20 so that a minimum of two cutting blades 50 can be used. Each blade 50 is mounted between the spaced peripheral edges 44 of the discs 38 and 40 by a pivot pin 52 and a journal 54 positioned around the pivot pin 52, as shown best in FIG. 3.

These cutting blades 50 are basically unbalanced in action. The centrifugal force created by the unbalanced blade 50 in the spinning cutting head 20 causes each blade 50 to project radially, with enough stiffness of action, i.e., resistance to deflecting forces such as are caused by the matter incident on the blade 50, to cut grass but yield readily upon any contact with rocks, other obstacles, or the feet or hands of the operator of the lawn mower, as will be described more in detail subsequently.

Referring now to the details of the blade 50, shown best in FIG. 4, it is to be noted that its construction is basically symmetrical, with the pivot hole 56 for the pivot journal 54 being shaped in the form of two semi-circles 58 and 60 spaced apart a predetermined amount as indicated by "total eccentricity of action" 62. This degree of eccentricity 62 for a given weight of blade 50, with a given inertia, determines the degree of centrifugal force holding the blade 50 in a radial position for cutting grass. Tangent lines parallel to the centerline joining the geometrical centers of the semi-circles 58 and 60 further define the pivot hole 56, the tangent lines being of a length less than the length of the diameters of the semi-circles 58 and 60. The main purpose of the construction of the blade 50 is to provide just enough force to cut grass but not enough to hurl objects or to do damage to the hands or feet of the operator by accidental exposure.

Edges 64 of the blade 50, shown in FIGS. 2 and 4, are utilized for cutting of the grass. The fan edges 66 of the blade 50 create a strong updraft that lifts the blades of grass vertically and ejects the grass clippings through the conventional discharge chute or channel of the lawn mower. Due to the symmetrical construction of the blade 50, either end thereof is effective in cutting and fanning action.

The purpose of the fanning action is to create a strong updraft of air around the periphery of the discs 38 and 40. This updraft of air over the edge of the discs 38 and 40 is very effective in straightening the grass blades up and in effect stiffening the grass blades against the action of the blades 50 for easier, cleaner cutting of the grass.

A further benefit of the draft created by the blades 50 is more thorough ejection of the cut grass or weeds, etc. From the mower cavity, the updraft could also be created by twisting the individual blades in the form of a fan blade. Many conventional blades have a twist on their end to create the updraft but it is uncontrolled as to path due to the discontinuity of the blade as compared to construction of the blades 50 and discs 38 and 40 of the cutting head 20.

The blades 50 are relatively short; they are freely pivotal mounted and are slightly, very slightly, unbalanced in order to make them orientate radially outward from the center of the discs 38 and 40 as the discs 38 and 40 are spun by the engine of the power mower.

Each blade 50 has been so designed and constructed that its potential energy level while cutting is so low that impact with any rock or piece of metal will cause the blade 50 to spin back away from the rock rather than throw the rock outwardly at a dangerous velocity. In other words, if the energy required to throw the rock at a dangerous velocity is greater than can be delivered to it by the free-to-pivot cutting blades 50, no throwing will occur.

The heavier and more potentially lethal the foreign object the less it will move. What is achieved here is a nice, controlled, predictable balance between the amount of force required to cut grass and the amount required to throw rocks, etc., at a dangerous velocity. It in effect is a safety valve (or Clutch) that only permits a given level of energy to be built up in the blade 50, just high enough to cut grass but not enough to throw rocks. This low level of potential energy also prevents cutting through foot shoes and seriously injuring feet that may accidently thrust in the path of mower action, even bare feet or bare hand would less likely be seriously injured if withdrawn quickly enough.

This low level of impact energy (potential energy) is helped to be achieved by running the mower engine at reduced speed. The multiplicity of blades 50 permits smoother, even mowing and reduced speed of the mower because more cutting passes are being made per revolution due to the extra blades 50.

Further benefits of reduced engine speed are: less noise, less exhaust fumes to be breathed, less gasoline consumption, and longer engine life.

A further economic benefit is less blade maintenance expense because the short individual blades 50 can be discarded and replaced with factory sharp blades 50 in perfect balance at less cost than resharpening and rebalancing old blades of conventional design.

Referring back to the construction of blade 50 it was stated that some controlled degree of blade weight eccentricity is necessary to orientate the blade radially outward with enough force to cut grass but not enough to be dangerous.

Figure 1:
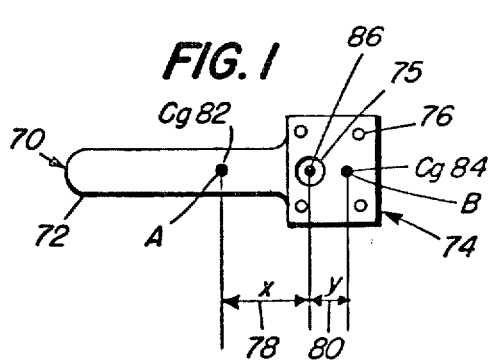
FIG. 1 is a plan view of a single ended, pivotally counterbalanced blade for use in the cutting head of FIG. 2.

Referring now to FIG. 1 of the drawings, there is shown a single ended blade 70 which can be mounted in the rotary cutting head 20, in place of the use of blades 50. These blades 70 operate similarly to blades 50 in that the blade end 72 is heavier than the counter balance block 74 by a predetermined amount to cause centrifugal force to maintain a radially projected attitude of the blade 70 as referred to in the discussion of blade 50 in FIG. 4. The pivot point 75 of this blade 70 is circular and not elongated as for the blade 50 as previously discussed. Rivets 76 hold the blade 70 to the counter balanced block 74. The moment of inertia at the center of gravity 82 of the blade end 72 and the moment of inertia at the center of gravity 84 of the counter balance block 74 are approximately equal. The moment of inertia A of blade end 72 times the distance indicated by reference numbered 78 must be slightly greater than the moment of inertia B of the counter balance block 74 times the distance indicated by reference numeral 80, such that $$Ax > By$$

by a predetermined amount. The distances indicated by reference numerals 78 and 80 are measured from the center of gravities of blade end 72 and counter balance block 74 to the center of rotation 86 of the blade 70.

It is to be noted that the discussion covering the dynamics of the blade 70 of FIG. 1 applies in a similar manner to blade 50 of FIG. 4, except that the eccentricity is created by shifting the center of rotation of blade 50 rather than by having inequal weights as discussed for blade 70. Thus, a counter balancing centrifugal force may be applied to mower blades according to the invention by use of an elongated pivot hole or by use of a pivot weight.

Referring again to FIGS. 2 and 3 of the drawings, it will be noted that the bottom disc 38 in FIG. 3 is provided with the pivot mounting pin 52 that is affixedly attached to disc 38 and receives a slot 90 of a keyhole 92 in shoulder groove 94, shown in FIGS. 2 and 3. Pivot journal 54 is captured between discs 38 and 40, and positioned on boss 96.

The keyhole shape of the keyhole opening 92 requires that the pivot pin 52 be inserted through the large opening, and then by rotating the disc 40 clockwise, the edges defining slot 90 slides around shoulder groove 94 of pivot pin 52 and causes holes 34 to come into rotational alignment around hole 36 of the discs 38 and 40 and the hub 24 permitting pins 32 of the hub 24 to lock into the holes 34 for complete and final operational assembly of the blade 50.

It is to be noted that the embodiment of the rotary cutting head 20, with the utilization of the blades 50, as described is preferred because it permits the replacement of the blades 50 without any danger of improper reassembly such as a bolted assembly might permit through the use of improper locking devices for the bolted assembly.

Figure 6:
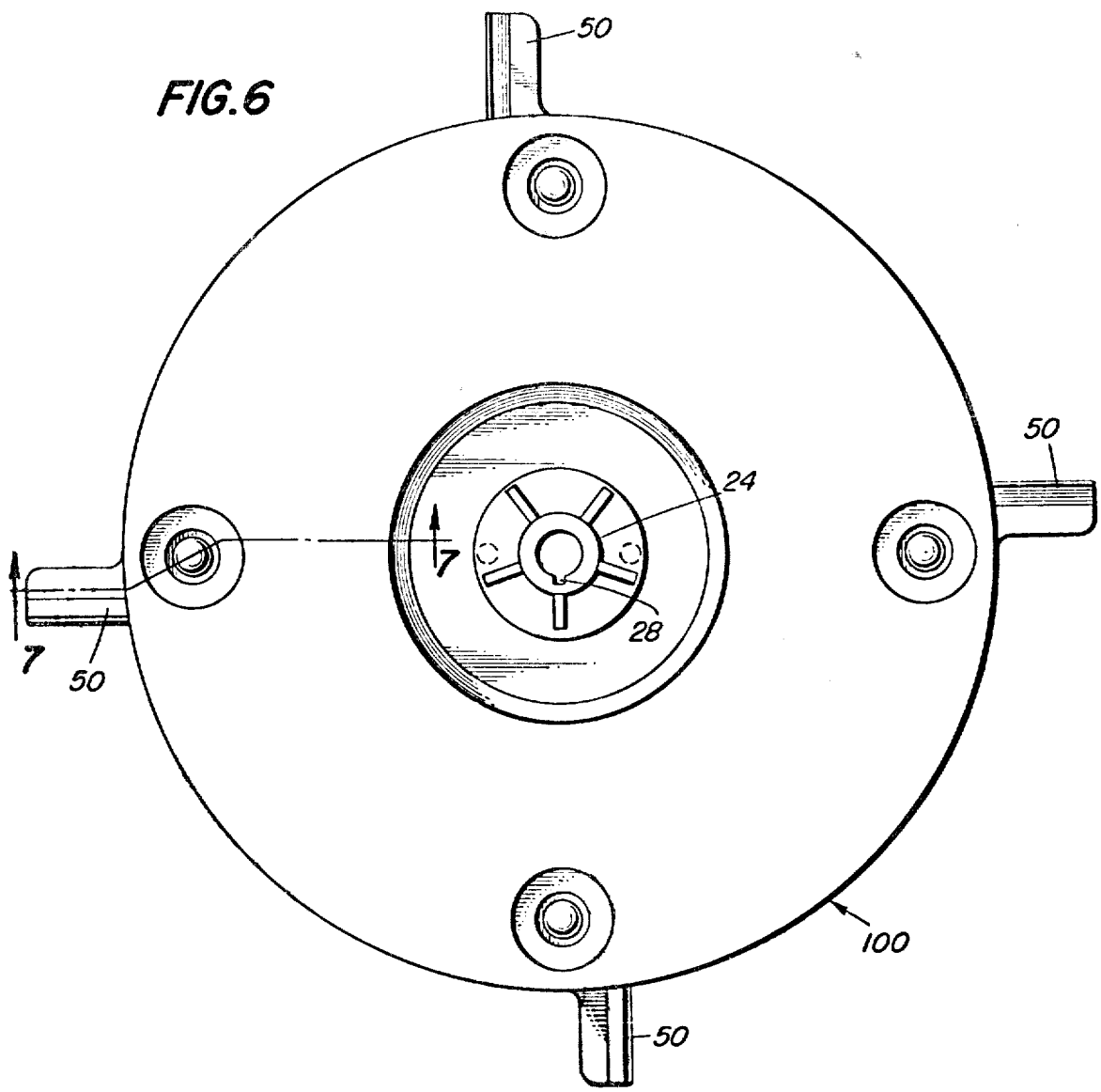
FIG. 6 is a plan view of a cutting head similar to the cutting head of FIG. 2, utilizing a riveted assembly of the disc system.
Figure 7:
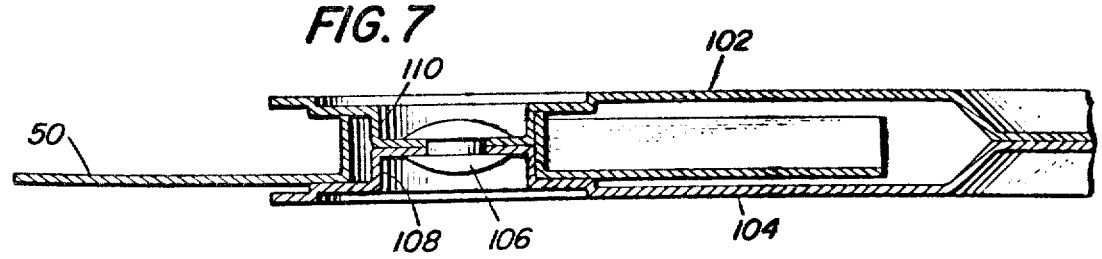
FIG. 7 is a cross-section taken along line 7—7 of FIG. 6.

Referring now to FIGS. 6 and 7 of the drawings, there is shown a riveted rotary cutting head 100 having blades 50 as previously discussed. The only difference between the cutting head 20 and the cutting head 100 is the provision for connecting the two discs 102 and 104 together. The discs 102 and 104 are connected by a rivet 106 in countersunk pockets 108 and 110. The countersinking of this rivet 106 is important from a safety standpoint because the rivet head is not exposed to abrasion from sand and gravel that might be encountered in mowing of grass. It may be noted that the same countersinking provision is made in rotary cutting head 20.

Figure 8:
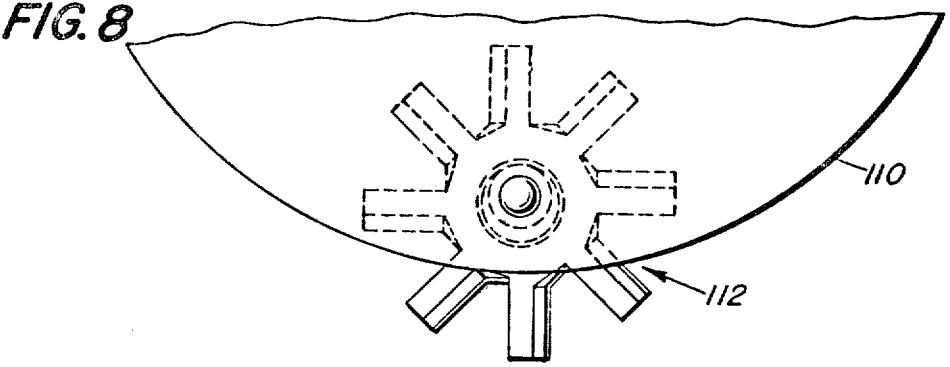
FIG. 8 is a plan view of a pivotally mounted, multiple cutting finger blade for a cutting head.
Figure 9:
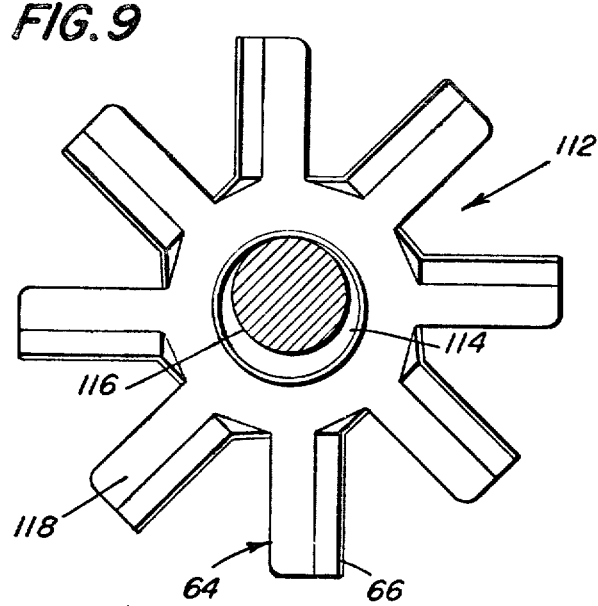
FIG. 9 is a plan view of the pivotally mounted, multiple cutting finger blade of FIG. 8 showing the pivotal eccentric mounting of the blade.

Referring to FIGS. 8 and 9 of the drawings, there is illustrated a section of a rotary cutting head 110 formed of two discs previously described for rotary cutting heads 20 and 100, showing a multiple finger blade 112 having an oversize hole 114 relative to the diameter of the pivot pin 116. This permits an unbalanced condition to exist similiar to that described for the blade 50 of the rotary cutting heads 20 and 100. The fingers 118 of the blade 112 have similar cutting edges 64 and fan edges 66 of blade 50.

Figure 10:
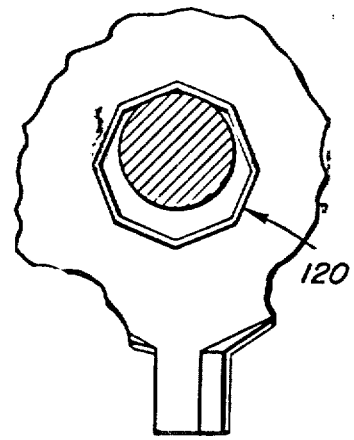
FIG. 10 is a plan view of a modified pivot hole for the pivotally mounted, multiple cutting finger blade of FIGS. 8 and 9.

By making the hole 120 of polygonal shape as shown in FIG. 10, with the apex of each facet of the polygon diametrically opposite a cutting finger 118, it tends to maintain the proper orientation for proper cutting of the grass and leaves the blade 112 free to spin away from a foreign object as previously described.

Figure 11:
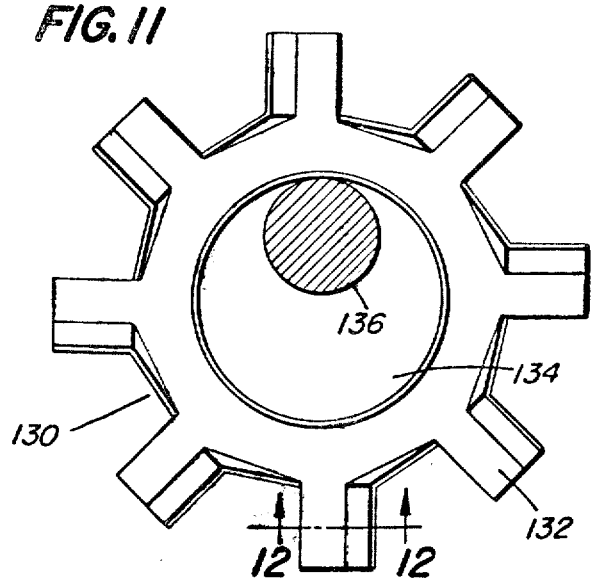
FIG. 11 is a plan view of a modified pivotally mounted, multiple cutting finger blade showing a modified pivotal eccentric mounting of the blade.
Figure 12:
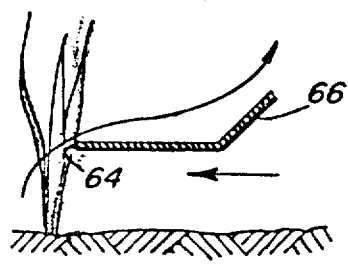
FIG. 12 is a cross-section taken along line 12—12 of FIG. 11 showing a typical cutting finger of the modified pivotally mounted, multiple cutting finger blade of FIG. 11; and, FIG. 13 is a cross-section of another embodiment of the invention employing "friction-discs" to allow the cutting head to move relative to the drive shaft on imposition of an extraordinary loading on the head.

FIG. 11 illustrates a multiple finger blade 130, similar to the blades 112 of FIGS. 8 and 9, except that the blade fingers 132 are of shorter length and the hole 134 for the pivot pin 136 is of larger diameter than the pin 136 to permit the blade 130 to rebound and rotate upon striking an object.

Figure 13:
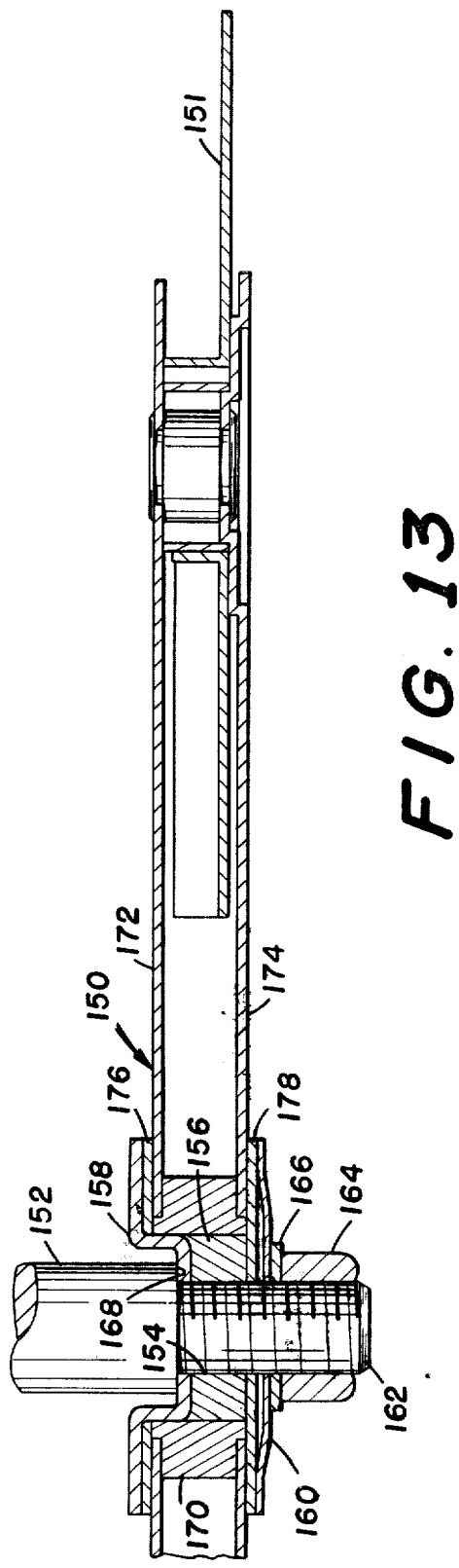

Another embodiment of the invention is shown in FIG. 13 to comprise a cutting head 150 having blades 151 which is mounted on a vertical shaft 152 and is rotated thereby in a fashion similar to that previously described for the cutting head 20. The cutting head 150 has a central aperture 154 disposed therein, the aperture 154 being defined by an annular spring spacer 156, an annular flanged brake shoe 158, and a "Belleville" spring 160. A threaded portion 162 of the shaft 152 is fitted into the aperture 154 and secured therein by a retaining nut 164 and a cupped washer 166. The threaded portion 162 is reduced in diameter so that shoulder portions 168 of the shaft engage the upper surfaces of the brake shoe 158 to hold the cutting head 150 on the shaft 152. An annular journal spacer 170 abuts and is joined to the outer perimetric surfaces of the brake shoe 158 and the spring spacer 156 at over its inner surface and is attached to upper and lower body portions 172 and 174 of the cutter head 150 over its outer surface. Annular friction discs 176 and 178 are employed to allow displacement of the cutting head 150 about the shaft 152 on imposition of an extraordinary loading on the head 150. The friction disc 176 is disposed between the flanged portion of the brake shoe 158 and the upper surface of the upper body portion 172. The friction disc 178 is disposed between the spring 160 and the outer surface of the lower body portion 174. The friction discs 176 and 178 are torqued to a pre-determined degree by means of the nut 164 and the spring 160, a pre-determined torque allowing slippage of the head relative to the shaft when the pre-set torque is exceeded.

Use of the cutting head 150 in a typical grass-cutting situation offers the possibility of accidential impact of the head 150 itself with heavy objects such as stones, steel stakes, and the like. The friction discs 176 and 178 act in the manner of a clutch mechanism in such a situation to allow the cutting head 150 to "slip" on the shaft 152 until the head 150 can be removed from engagement with the heavy or immobile object. The shaft 152 is thereby allowed to continue turning until the angle of impact between the head 150 and the object has changed sufficiently to allow the head to glance off the object. The engine of the mower, the shaft 152, and the head 150 is thereby left undamaged.

The blades 151 may also be mounted on the head 150 in the same manner as are the blades 50 of FIGS. 2 and 3 mounted to the cutting head 20. Impact of one of the blades 151 when in certain attitudes with respect to the cutting head 150 may also cause damage to the mowing device due to the inability of the blade 151 to yield to the increased loading as described previously. In such a situation, the cutting head 150 itself can slip on the shaft 152 due to the provision of the friction discs 176 and 178. Thus, the shaft 152 continues the rotary motion until such time as the angle of impact between the blade 151 and the object has changed sufficiently to allow the blade 151 to "glance off" the object without damage to any portion of the mowing device. The connection between the shaft 152 and the head 150 provided by the friction discs 176 and 178 is a friction connection rather than a solid connection, thereby allowing a pre-determined torque level to be established between the shaft and the head to cause slippage of the head relative to the shaft on imposition of a potentially destructive impact on the head.

Obviously, many modifications and variations of the present invention are possible in light of the above teachings. It is, therefore, to be understood that within the scope of the appended claims the invention may be practiced otherwise than as specifically described.

What is claimed is:

1. A rotary lawn mower blade assembly operable with a prime mover on a lawn mower, comprising:
   shaft means rotatable by the prime mover on said lawn mower;
   hub means connected to said shaft means;
   a cutting head connected to said hub means and shaft means for rotation therewith;
   at least two cutting blades pivotally mounted around the peripheral edge of said cutting head and being disposed between the upper and lower surface thereof and oppositely thereon along a line taken through the center of rotation of said cutting head;
   annular journal means formed in said cutting head at each point thereon where a cutting blade is mounted; and,
   a pivot hole formed in each cutting blade, said pivot hole being positioned symmetrically about the longitudinal and transverse axes of said blade and receiving the journal means therein whereby the cutting blade is rotatable about said journal means and is radially imbalanced thereabout, rotation of the cutting head causing the cutting blades to extend outwardly therefrom.

2. The rotary lawn mower blade assembly of claim 1 wherein the blades are symmetrically constructed and have cutting blades at each end thereof, and wherein the pivot hole in each blade is defined by two intersecting circles of the same diameter joined on diametrically opposite sides thereof by tangent lines parallel to the centerline joining the centers of said circles, the centerline being disposed symmetrically and longitudinally on said blade, the distance between the centers of said circles being the total amount of eccentricity of action of the cutting blade required to produce the radial inertial imbalance of the blade necessary to provide a degree of tangential blade force adequate to and only adequate to cut grass or the like.

3. The rotary lawn mower blade assembly of claim 1 wherein each cutting blade is formed with a fan edge opposite a cutting edge thereof for creating a upwardly directed draft of air which lifts plant materials for easier cutting thereof and ejects plant clippings from the location of the cutting head.

4. The rotary lawn mower blade assembly of claim 1 wherein each cutting blade comprises a blade end and counter balance means, the blade end extending outwardly on rotation of the cutting head as a result of the product of the moment of inertia of the blade end and the distance of the center of gravity of said blade end from the center of rotation of said cutting blade being greater than the product of the moment of inertia of the counter balance means and the distance of the center of gravity of said counter balance means from the center of rotation of said cutting blade.

5. The rotary lawn mower blade assembly of claim 4 wherein said counter balance means comprises a counter balance block.

6. The rotary lawn mower blade asembly of claim 4 wherein said counter balance means comprises a second blade end opposite the first-mentioned blade end and symmetrical with said first-mentioned blade end about a transverse centerline take through the cutting blade.

7. The rotary lawn mower blade assembly of claim 3 wherein each cutting blade is provided with an oversized pivot hole and a plurality of cutting fingers.

8. The rotary lawn mower blade assembly of claim 7 wherein the pivot hole is of polygonal shape with the apex of adjacent sides thereof being diametrically opposite a finger of the blade.

9. The rotary lawn mower blade assembly of claim 1 wherein said cutting head comprises:
  spaced disc members held together at the center portions thereof for coupling to said hub means and being spaced apart about the peripheral edge thereof;
  pin means attached to one of said disc members, each said pin means having a reduced-in-diameter shoulder groove intermediate the ends thereof, the pin means being located within said journal means; and,
  keyhold means comprising intersecting relatively large and relatively small slot openings located in the other of said disc members and corresponding to the location of said pin means in the first disc member, whereby the pin means are insertable into the relatively large slot openings in said keyholes and the first-mentioned disc member is rotated to bring said shoulder grooves of said pin means into engagement with the relatively small slot openings.

10. The rotary lawn mower blade assembly of claim 9 and further comprising mating holes in the hub means and in the cutting head which align on engagement of the shoulder grooves on said pin means with the relatively small slot openings, and pins for locking the mating holes into aligned positions thereby to assemble the cutting head in a unitary structure.

11. The rotary lawn mower blade assembly of claim 1 and further comprising clutch means on the shaft means for allowing the cutting head to move radially relative to the shaft means on imposition of an extraordinary loading force on the cutting head.

12. The rotary lawn mower blade assembly of claim 11 wherein the clutch means comprise friction discs disposed between the outer surfaces of body portions of the cutting head and elements of the hub means.

13. The rotary lawn mower blade assembly of claim 2 wherein the length of the tangent lines is less than the diameter of the circles.

* * * * *